United States Patent
Koehler et al.

(10) Patent No.: US 8,526,757 B2
(45) Date of Patent: Sep. 3, 2013

(54) IMAGING SYSTEM AND IMAGING METHOD FOR IMAGING A REGION OF INTEREST

(75) Inventors: Thomas Koehler, Norderstedt (DE); Peter Forthmann, Sandesneben (DE)

(73) Assignee: Koninklijke Philips N.V., Eindhoven (NL)

( * ) Notice: Subject to any disclaimer, the term of this patent is extended or adjusted under 35 U.S.C. 154(b) by 429 days.

(21) Appl. No.: 12/600,062

(22) PCT Filed: May 13, 2008

(86) PCT No.: PCT/IB2008/051878
§ 371 (c)(1),
(2), (4) Date: Nov. 13, 2009

(87) PCT Pub. No.: WO2008/139414
PCT Pub. Date: Nov. 20, 2008

(65) Prior Publication Data
US 2010/0303381 A1    Dec. 2, 2010

(30) Foreign Application Priority Data
May 15, 2007   (EP) ..................................... 07108253

(51) Int. Cl.
*G06K 9/40* (2006.01)
(52) U.S. Cl.
USPC ......................................................... 382/275
(58) Field of Classification Search
USPC ........................... 382/100, 128, 130, 131, 275
See application file for complete search history.

(56) References Cited

U.S. PATENT DOCUMENTS

| | | | | |
|---|---|---|---|---|
| 6,035,012 A | * | 3/2000 | Hsieh | 378/4 |
| 7,636,461 B2 | * | 12/2009 | Spies et al. | 382/128 |
| 2005/0036294 A1 | | 2/2005 | McMahon | |
| 2005/0123215 A1 | * | 6/2005 | Man | 382/275 |
| 2005/0249431 A1 | | 11/2005 | Ruhmschopf | |
| 2006/0227928 A1 | * | 10/2006 | Timmer | 378/4 |
| 2010/0166140 A1 | * | 7/2010 | Proksa | 378/8 |

FOREIGN PATENT DOCUMENTS

| | | |
|---|---|---|
| EP | 1298963 A1 | 4/2003 |
| WO | 03083778 A1 | 10/2003 |
| WO | 2007004097 A1 | 1/2007 |

OTHER PUBLICATIONS

Hsieh, J.; Computed Tomography: Principles, design, artifacts, and recent advances; 2003; SPIE Optical Engineering Press; pp. 221-230.

* cited by examiner

*Primary Examiner* — Aaron W Carter

(57) ABSTRACT

The invention relates to an imaging system for imaging a region of interest, in particular to a computed tomography system. First data for generating an image of the region of interest are provided, which are used by a reconstruction unit (12) for reconstructing an image of the region of interest using an adaptable artefact correction method. Second data are provided by simulating the providing of the first data using the reconstructed image of the region of interest by a second data providing unit (13). A deviation determination unit (14) determines a deviation between the first and second data. An adaptation unit (15) adapts the artefact correction method such that the deviation between the first and second data is reduced and the reconstruction unit (12) reconstructs an image of the region of interest from first the data using the adapted artefact correction method.

20 Claims, 3 Drawing Sheets

IMAGING SYSTEM AND IMAGING METHOD FOR IMAGING A REGION OF INTEREST

FIELD OF THE INVENTION

The invention relates to an imaging system and imaging method for imaging a region of interest. The invention relates further to a corresponding computer program for imaging a region of interest.

BACKGROUND OF THE INVENTION

A lot of imaging systems for imaging a region of interest are known, for example, computed tomography systems, magnetic resonance imaging systems, ultrasound imaging systems or nuclear imaging systems. Images generated by these imaging systems generally comprise artefacts, which can be caused by different effects, for example, by movements within a region of interest, which has to be imaged, or by high density elements like metallic elements, which influence radiation traversing the region of interest.

In computed tomography systems, which use an X-ray source emitting X-rays and a detection unit for detecting the X-rays after having traversed the region of interest, metallic elements, for example, metal implants like hip replacements or dental fillings, cause severe artefacts in the reconstructed images. In order to reduce these artefacts, it is known to identify a shadow of the metallic elements in a sinogram, which is constituted of the detection values detected by the detection unit, for example, by thresholding, and to replace the detection values in the identified shadow by calculated values, which are determined by interpolation. A combination of detection values outside of the shadow and of the calculated values in the identified shadow is used for reconstructing an image of the region of interest. But even by using this artefact correction method, strong arte-facts are still present in the reconstructed image, resulting in a decreased image quality.

SUMMARY OF THE INVENTION

It is an object of the present invention to provide an imaging system, an imaging method and a computer program for imaging a region of interest, which generate a reconstructed image of the region of interest, which is less disturbed by artefacts and comprises therefore a higher image quality.

In another aspect of the present invention an imaging system for imaging a region of interest is presented, wherein the imaging system comprises:
  a first data providing unit for providing first data for generating an image of the region of interest,
  a reconstruction unit for reconstructing an image of the region of interest from the first data using an adaptable artefact correction method,
  a second data providing unit for providing second data by simulating the providing of the first data using the reconstructed image of the region of interest,
  a deviation determination unit for determining a deviation between the first and second data,
  an adaptation unit for adapting the artefact correction method, wherein the adaptation unit is adapted for adapting the artefact correction method such that the deviation between the first and second data is reduced and wherein the reconstruction unit is adapted for reconstructing an image of the region of interest from the first data using the adapted artefact correction method.

The invention is based on the idea that an artefact correction method, which is not sufficiently adapted, generates inconsistencies in the data, which can be identified retrospectively by determining a deviation between the first data, which are not influenced by the artefact correction method, and the second data, which are influenced by the artefact correction method, because the second data have been provided by simulating the providing of the first data using a reconstructed image of the region of interest, wherein the reconstructed image of the region of interest has been reconstructed by using the artefact correction method. This inconsistency between the first data and the second data is a measure for the degree of artefacts within the reconstructed image and, thus, of the image quality. If this inconsistency is reduced, also the disturbing appearance of the artefacts in the reconstructed image is reduced and, therefore, the image quality is increased. Thus, by adapting the artefact correction method such that the deviation between the first and second data is reduced, the image, which is reconstructed by using this adapted artefact correction method, shows an improved image quality.

It is preferred that the first data providing unit is adapted for providing first data being first projection data depending on radiation having traversed the region of interest and that the second data providing unit is adapted for providing second data being second projection data by forward projecting through the reconstructed image of the region of interest.

It is further preferred that the reconstruction unit is adapted for using an adaptable high density elements correction method as artefact correction method. Preferentially the adaptation unit is adapted for adapting at least one of the following parameters of the high density element correction method: extension of high density elements, absorption of high density elements. This allows reducing artefacts caused by high density elements like metal elements in the reconstructed image and, thus, improving the image quality, if artefacts are caused by high density elements.

It is further preferred that the reconstruction unit is adapted for using an adaptable beam hardening correction method as artefact correction method. This allows reducing artefacts in the reconstructed image caused by beam hardening.

In a further aspect of the present invention an imaging method for imaging a region of interest is presented, wherein the imaging method comprises:
  providing first data for generating an image of the region of interest by a first data providing unit,
  reconstructing an image of the region of interest from the first data using an adaptable artefact correction method by a reconstruction unit,
  providing second data by simulating the providing of the first data using the reconstructed image of the region of interest by a second data providing unit,
  determining a deviation between the first and second data by a deviation determination unit,
wherein the artefact correction method is adapted such that the deviation between the first and second data is reduced and wherein an image of the region of interest is reconstructed from the first data using the adapted artefact correction method.

In a further aspect of the present invention a computer program for imaging a region of interest is presented, wherein the computer program comprises program code means for causing an imaging system as defined in claim 1 to carry out the steps of the method as claimed in claim 6, when the computer program is run on a computer controlling the imaging system.

It shall be understood that the imaging system of claim 1, the imaging method of claim 6 and the computer program of claim 7 have similar and/or identical preferred embodiments as defined in the dependent claims.

It shall be understood that preferred embodiments of the invention can also be any combination of the dependent claims with the respective independent claims.

BRIEF DESCRIPTION OF THE DRAWINGS

These and other aspects of the invention will be apparent from and elucidated with reference to the embodiments described hereinafter. In the following drawings.

DETAILED DESCRIPTION OF EMBODIMENTS

Figure 1:
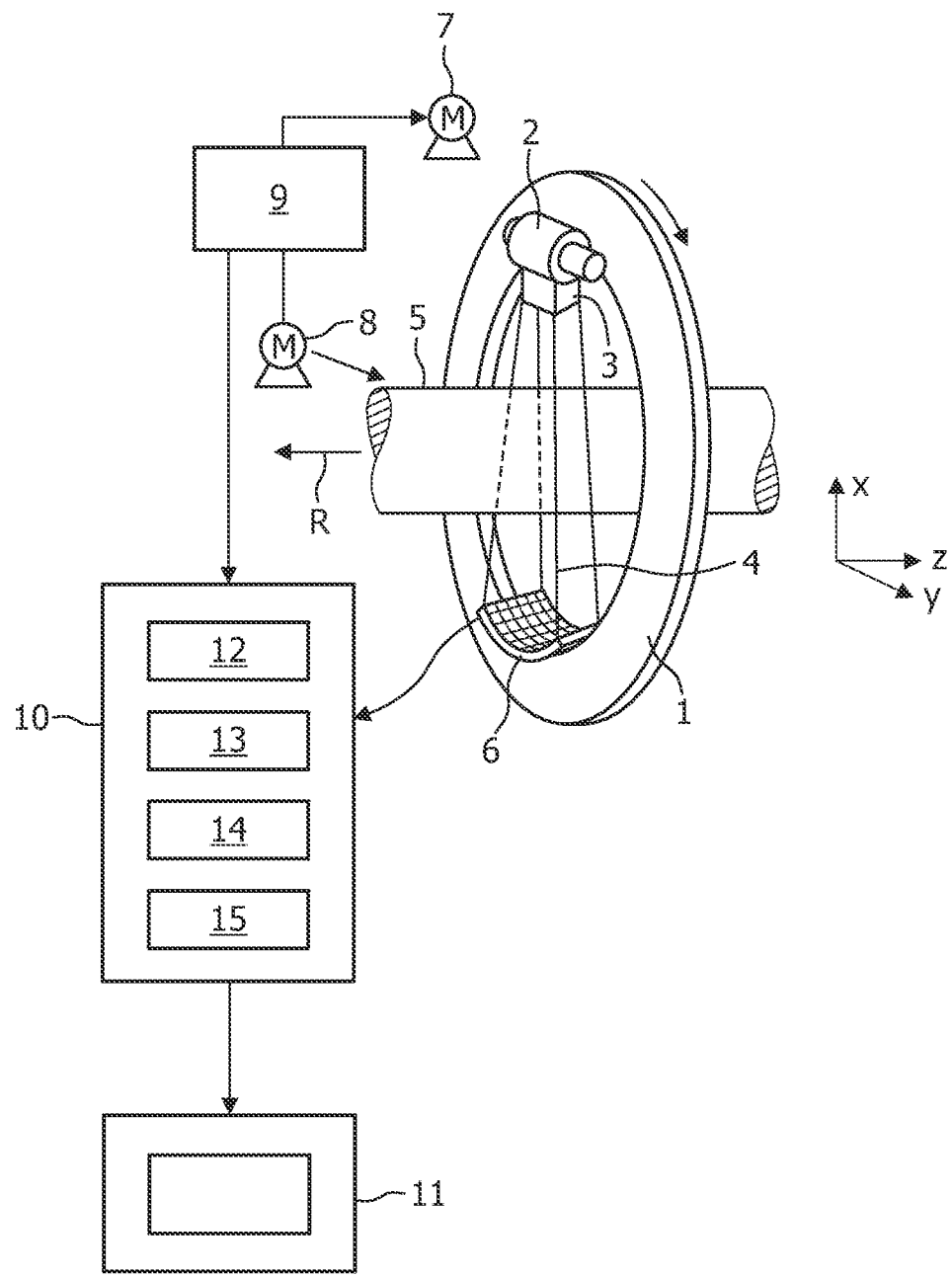
FIG. 1 shows schematically and exemplarily a representation of an imaging system for imaging a region of interest.

FIG. 1 shows schematically and exemplarily an imaging system for imaging a region of interest, being, in this embodiment, a computed tomography system. The computed tomography system includes a gantry, which is capable of rotating around an axis of rotation R which extends parallel to the z axis. A radiation source 2, for example, an X-ray tube, is mounted on the gantry 1. The radiation source 2 is provided with the collimator device 3 which forms a conical radiation beam 4 from the radiation emitted by the radiation source 2. In other embodiments, the collimator device 3 can be adapted for forming a radiation beam having another shape, for example, having a fan shape.

The radiation traverses an object (not shown), such as a patient or a technical object, in a region of interest in a cylindrical examination zone 5. After having traversed the region of interest, the radiation beam 4 is incident on a detection device 6 having, in this embodiment, a two-dimensional detection surface. The detection device is mounted on the gantry 1. In another embodiment, the detection device 6 can comprise a one-dimensional detection surface.

The detection device 6 comprises several detector elements, which are arranged in a rectangular grid, and the detection device 6 generates first projection data depending on the radiation after having traversed the examination zone 5, in particular, the region of interest.

The gantry 1 is driven at a preferably constant but adjustable angular speed by a motor 7. A further motor 8 is provided for displacing the object, for example, a patient who is arranged on a patient table in the examination zone 5, parallel to the direction of the axis of rotation R or the z axis. These motors 7, 8 are controlled by a control unit 9, for instance, such that the radiation source 2 and the examination zone 5, in particular, the region of interest, move relative to each other along a helical trajectory. It is also possible that the object or the examination zone 5, in particular, the region of interest, is not moved and that the radiation source 2 is rotated, i.e. that the radiation source 2 travels along a circular trajectory relative to the region of interest. The first projection data generated by the detection device 6 are provided to a calculation unit 10 comprising a reconstruction unit 12, a second data providing unit 13, a deviation determination unit 14 and an adaptation unit 15.

The reconstruction unit 12 is adapted for reconstructing an image of the region of interest from the first projection data using an adaptable artefact correction method. The adaptable artefact correction method is, for example, a beam hardening correction method, which can be used for correcting artefacts caused by beam hardening effects, which are generated by high density elements, in particular, metal elements, within the examination zone 5, in particular, within the region of interest. If artefacts caused by other effects have to be reduced, other corresponding adaptable artefact correction methods are preferentially used.

The second data providing unit 13 is adapted for providing second data being, in this embodiment, second projection data by forward projecting through the reconstructed image of the region of interest. During this forward projecting through the reconstructed image the acquisition geometry of the measurement of the first projection data is used.

The deviation determination unit 14 determines a deviation between the first projection data and the second projection data. Preferentially the deviation between the first and second projection data is determined by determining a root-mean-square of the differences between the first projection data and the corresponding second projection data. In other embodiments, also other measures for measuring a deviation between the first and second projection data can be used, for example, the absolute difference or a correlation.

The adaptation unit 15 is adapted for adapting the artefact correction method such that the deviation between the first and second projection data is reduced. If this deviation is reduced, the consistency of the first and second projection data is increased and, thus, an image reconstructed by using this adapted artefact correction method shows less artefacts yielding an improved image quality.

Also the calculation unit 10 is preferentially controlled by the control unit 9.

The reconstructed image, which has been reconstructed using the adapted artefact correction method, which has been adapted such that the deviation between the first and second data is reduced, is provided to a display unit 11 for displaying the image.

Preferentially the adaptation unit 15 is adapted for minimizing the deviation between the first and second data, which are, in this embodiment, first and second projection data.

Figure 2:
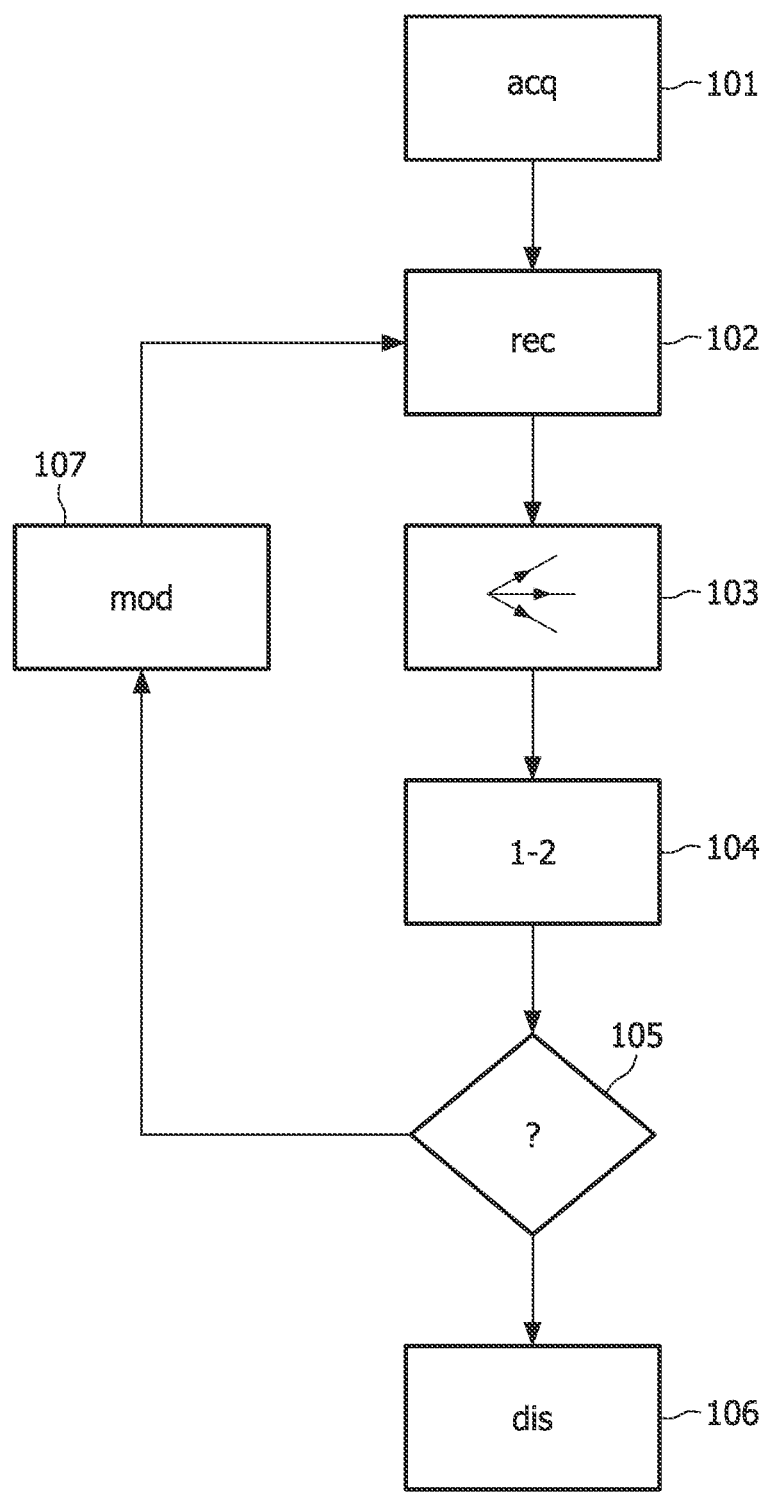
FIG. 2 shows a flowchart illustrating an embodiment of an imaging method for imaging a region of interest and FIG. 3 shows a flowchart illustrating a reconstruction of an image of the region of interest from first projection data using an adaptable artefact correction method.

In the following an embodiment of an imaging method for imaging a region of interest in accordance with the invention will be described in more detail with respect to a flowchart shown in FIG. 2.

In step 101, the radiation source 2 rotates around the axis of rotation R or the z axis and the object is not moved, i.e. the radiation source 2 travels along a circular trajectory around the object. In another embodiment, the radiation source 2 can move along another trajectory, for example, a helical trajectory relative to the object. The radiation source 2 emits radiation, in this embodiment, X-ray radiation, traversing the object, which is present in the examination zone 5 and which comprises metal elements. The object is, for example, a human patient comprising metallic hip replacements or metallic dental fillings. The radiation, which has traversed the object, is detected by the detection device 6, which generates first projection data. Thus, in step 101 first projection data are acquired.

In this embodiment, the elements of the computed tomography system, which provide the first projection data, are a first data providing unit. Therefore, the first data providing unit comprises, in this embodiment, the radiation source 2, the detection device 6, the gantry 1, the motor 7, 8 and the control unit 9.

Figure 3:
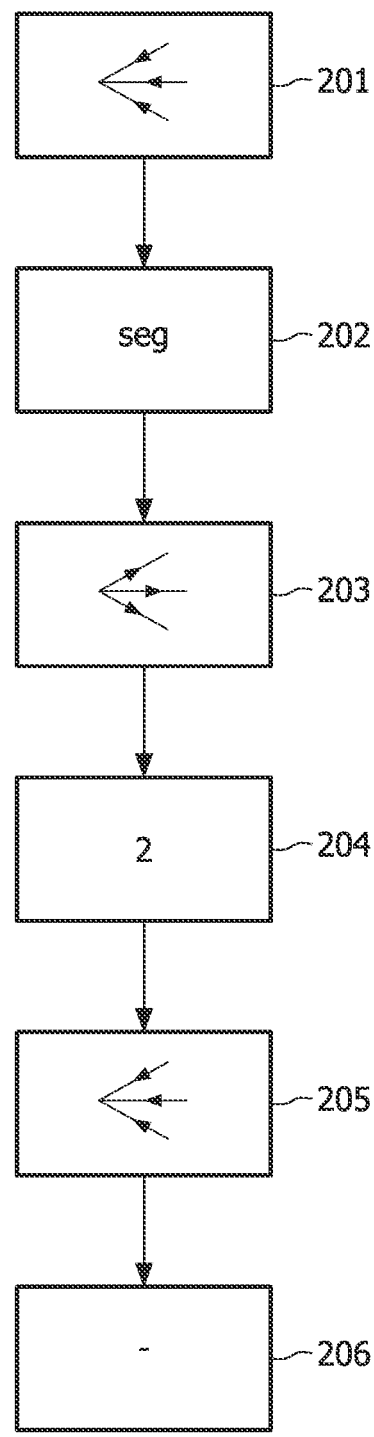

The first projection data are transmitted to the calculation unit 10 and, in step 102, the reconstruction unit 12 reconstructs an image of the region of interest from the first projection data using an adaptable artefact correction method. In this embodiment, artefacts caused by metallic elements within the region of interest have to be reduced, and an adaptable beam hardening correction method is used. This preferred reconstruction of an image of the region of interest using an adaptable beam hardening correction method will in the following will be described in detail with reference to a flowchart shown in FIG. 3.

In step 201, a preliminary image of the region of interest is reconstructed from the first projection data, preferentially by a filtered backprojection. In other embodiments the preliminary image can also be reconstructed by other reconstruction methods, for example, by radon inversion. The preliminary image is preferentially water corrected.

In step 202, the preliminary image is segmented into metal parts and non-metal parts by thresholding. In step 203, metal-only projection data are generated by forward projecting only through the metal parts of the preliminary image. This forward projection is performed using the acquisition geometry, which has been used for acquiring the first projection data in step 101. In step 202, the metal-only projection data are squared by multiplying each individual projection data with itself to produce error projection data.

The error projection data are used for reconstructing an artefact-only image in step 205. Also this reconstruction is preferentially performed by a filtered backprojection, but, in other embodiments, also other reconstruction methods like, for example, Radon inversion, can be used. In step 206, the artefact-only image is scaled with an empirical factor (which depends e.g. on the tube spectrum), and this scaled artefact-only image is subtracted from the preliminary image to produce an corrected image being the outcome of step 102. This empirical factor can be determined using proper calibration experiments. For example, if a phantom is provided, where a certain part can be equipped with metal or not, this phantom can be scanned with and without the metal insert. Since ground truth for the image area outside the metal is known, the scaling factor can be determined to minimize the residual error between ground truth and the corrected image. This scaling factor, i.e. the empirical factor, can be stored and applied for all subsequent acquisitions with the same acquisition parameters.

The steps 201 to 206 are similar to the beam hardening correction described in "Computed tomography: Principles, design, artifacts, and recent advances", J. Hsieh, Bellingham (Washington), USA, SPIE Optical Engineering Press; 2003, in which the high density element, which causes beam hardening artefacts, is a bone element. This article is herewith incorporated by reference.

Referring again to FIG. 2, in step 103, the image reconstructed in step 102 is used for providing second projection data by the second data providing unit 13. The second data providing unit 13 simulates the providing of the first projection data using the image of the region of interest generated in step 102. In this embodiment, this simulation is performed by forward projecting through the reconstructed image of the region of interest in the acquisition geometry, which has been used for acquiring the first projection data in step 101.

In step 104, the deviation determination unit 15 determines a deviation between the first projection data and the second projection data. This is preferentially performed by generating the difference between the first projection data and the corresponding second projection data and by generating the root-mean-square of the generated differences. In other embodiments, other measures can be used for determining the deviation between the first projection data and the second projection data.

In step 105, it is determined whether steps 102 to 104 have been performed for the first time. If this is the case, the imaging method continues with step 107.

In step 107, the adaptation unit 15 adapts the artefact correction method. If the artefact correction method is a method for correcting artefacts caused by high density elements like metal elements and if this artefact correction method uses a determined and/or assumed extension and/or absorption of high density elements, the adaptation unit 15 can modify the extension and/or absorption of the high density elements, which have been determined and/or assumed by the artefacts correction method, in order to adapt the artefact correction method. In this embodiment, the adaptation unit 15 modifies the threshold, which is used in step 202 for segmenting the preliminary image into metal parts and non-metal parts. By modifying this threshold, the extension of the metal elements, in particular, the extension of the metal parts in the preliminary image, is modified.

After step 107, in step 102, again an image of the region of interest from the first projection data is reconstructed as described above, wherein, however, the reconstruction is performed using the adapted artefact correction method, which has been adapted in step 107. Then, in step 103, again second projection data are provided, wherein the image currently reconstructed in previous step 102 is used, and, in step 104, the deviation between the first projection data provided in step 101 and the second projection data provided in previous step 103 is determined as already described above.

If steps 102 to 104 have been performed at least for the second time, in step 105, it is determined whether a given sufficiency condition is fulfilled. If the sufficiency condition is fulfilled, the reconstructed image, for which the smallest deviation has been determined in step 104 is transmitted to the display unit 11 for displaying this image in step 106. If the sufficiency condition is not fulfilled, steps 107, 102 to 105 are repeated again for determining a further deviation between the first projection data and second projection data, which are provided using a reconstructed image, which is reconstructed using a further adapted artefact correction method. Thus, steps 107, 102 to 105 are repeated until the sufficiency condition is fulfilled, wherein each time step 107 is performed, the artefact correction method is adapted to an adapted artefact correction method, which is different to adapted artefact correction methods, which have been used before, i.e. whose adaptation differs from adaptations used before.

The sufficiency condition is, for example, that the deviation between the first projection data and the second data determined in step 104 is below a predetermined threshold and/or is minimized and/or the steps 107, 102 to 105 have been repeated a predetermined number of times.

According to the above described embodiment, the first data providing unit provides first data for generating an image of the region of interest, the reconstruction unit 12 reconstructs an image of the region of interest from the first data using an adaptable artefact correction method, the second data providing unit 13 provides second data by simulating the providing of the first data using the reconstructed image of the region of interest, the deviation determination unit 14 determines a deviation between the first and second data and the adaptation unit 15 adapts the artefact correction method, wherein the reconstruction unit is adapted for reconstructing an image of the region of interest from the data using the adapted artefact correction method. The deviation between first and second data is determined using different reconstructed images, which have been reconstructed using the differently adapted artefact correction method. After the sufficiency condition has been fulfilled, the reconstructed image of the different reconstructed images is displayed, which corresponds to the smallest deviation between the first and second data, which has been determined by the deviation determination unit 14. Thus, the adaptation unit 15 adapts the artefact correction method such that the deviation between the first and second data is reduced and a reconstructed image, which has been reconstructed using the artefact correction method, which has been adapted in such a way, is displayed.

Although in the above described embodiments first projection data are provided by elements of a computed tomography system being a first data providing unit, also other imaging systems can be used as first data providing unit, for example, magnetic resonance imaging systems, ultrasound imaging systems or nuclear imaging systems. Furthermore, the first data providing unit can also be a data storage unit, on which first projection data are already stored or a data connection via which first projection data can be received. The first data providing unit can also be a simulation unit, for example, a computer system, on which a generation of first data is simulated.

In the above described embodiments a computed tomography system is described, wherein the radiation source travels along a circular or helical trajectory with respect to the examination zone, in particular, the region of interest. But, if elements of a computed tomography systems are used as a first data providing unit, the radiation source can also travel along other trajectories relative to the examination zone.

In the above described embodiments the second data providing unit performs a forward projection for simulating the providing of the first data, in particular, for simulating the measuring process. If the first data are provided in another way, for example, by using an magnetic resonance imaging system, an ultrasound imaging system or a nuclear imaging system, the second data providing unit is adapted such that the corresponding measuring process, which has lead to the provided first data, is simulated using the reconstructed image of the region of interest for providing second data.

In the above described embodiments metal elements are present in the object and artefacts caused by these metal elements in the reconstructed image are reduced. In other embodiments, the imaging system and the imaging method can reduce artefacts caused by other high density elements, for example, caused by bones of a patient. Furthermore, in other embodiments the artefact correction method can be adapted for correcting artefacts caused by other effects, for example, caused by a movement within the region of interest. In any case, an adaptable correction method is used, which corrects the respective kind of artefact in the reconstructed image, and the artefact correction method is adapted such that a deviation between the first data and second data is reduced. For example, in the case of a movement within the region of interest which causes a movement artefact in a reconstructed image, an adaptable movement artefact correction method is preferentially used.

Although in the above described embodiments metal elements like hip replacements or dental fillings implemented in a patient have been described, the invention can also be applied to other objects, for example, to technical objects, wherein the imaging system uses an adaptable artefact correction method for correcting artefacts in an image of the technical object.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit may fulfill the functions of several items recited in the claims. The mere fact that certain measures are recited in mutually different dependent claims does not indicate that a combination of these measures cannot be used to advantage.

Calculations and/or determinations performed by one or several units or devices can be performed by any other number of units or devices. For example, the steps performed by the reconstruction unit 12, the second data providing unit 13, the deviation determination unit 14 and the adaptation unit 15 can be performed by one unit performing all these steps or by any other number of units performing these steps.

The reconstruction unit 12, the second data providing unit 13, the deviation determination unit 14 and the adaptation unit 15 can be implemented as program code means of a computer program which can run on a computer system, or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. An imaging system for imaging a region of interest, the imaging system comprising:
    a first data providing unit that provides first data for generating an image of the region of interest,
    a reconstruction unit that reconstructs an image of the region of interest from the first data using an adaptable artifact correction method,
    a second data providing unit that provides second data by simulating the providing of the first data using the reconstructed image of the region of interest,
    a deviation determination unit that determines a deviation between the first and second data, and
    an adaptation unit that adapts the artifact correction method, wherein the adaptation unit adapts the artifact correction method such that the deviation between the first and second data is reduced and wherein the reconstruction unit reconstructs an image of the region of interest from the first data using the adapted artifact correction method.

2. The imaging system as defined in claim 1, wherein the first data providing unit provides first data being first projection data depending on radiation having traversed the region of interest, the second data providing unit provides second data being second projection data by forward projecting through the reconstructed image of the region of interest.

3. The imaging system as defined in claim 1, wherein the reconstruction unit uses an adaptable high density elements correction method as artifact correction method.

4. The imaging system as defined in claim 3, wherein the reconstruction unit uses an adaptable beam hardening correction method as artifact correction method.

5. The imaging system as defined in claim 3, wherein the adaptation unit adapts at least one of the following parameters of the high density element correction method:
    extension of high density elements,
    absorption of high density elements.

6. An imaging method for imaging a region of interest, the imaging method comprising:
providing first data for generating an image of the region of interest by a first data providing unit,
reconstructing an image of the region of interest from the first data using an adaptable artifact correction method by a reconstruction unit,
providing second data by simulating the providing of the first data using the reconstructed image of the region of interest by a second data providing unit, and
determining a deviation between the first and second data by a deviation determination unit,
wherein the artifact correction method is adapted such that the deviation between the first and second data is reduced and wherein an image of the region of interest is reconstructed from the first data using the adapted artifact correction method.

7. A non-transitory computer readable storage medium encoded with computer readable instructions, which, when executed by a processer, causes the processor to:
provide first data for generating an image of the region of interest by a first data providing unit,
reconstruct an image of the region of interest from the first data using an adaptable artifact correction method by a reconstruction unit,
provide second data by simulating the providing of the first data using the reconstructed image of the region of interest by a second data providing unit, and
determine a deviation between the first and second data by a deviation determination unit,
wherein the artifact correction method is adapted such that the deviation between the first and second data is reduced and wherein an image of the region of interest is reconstructed from the first data using the adapted artifact correction method.

8. The method of claim 6, further comprising:
segmenting the first data to generate the second data.

9. The method of claim 6, further comprising:
segmenting the first data into metal parts and non-metal parts to generate the second data by thresholding.

10. The method of claim 9, further comprising:
forward projecting only through the metal parts by thresholding to generate the second data.

11. The method of claim 10, further comprising:
multiplying each individual projection data with itself to produce error projection data to generate the second data.

12. The method of claim 11, further comprising:
reconstructing the error projection data to generate the second data.

13. The method of claim 12, wherein the reconstructed error projection data produces an artifact-only image to generate the second data.

14. The method of claim 13, further comprising:
scaling the artifact-only image with an empirical factor that depends on an energy spectrum of an x-ray tube used to acquire the first data to generate the second data.

15. The method of claim 14, further comprising:
subtracting the scaled artifact-only image from the reconstructed image and producing an error image to generate the second data.

16. The method of claim 15, further comprising:
forward projecting the error image to generate the second data.

17. The method of claim 6, wherein the artifact correction method uses at least one of a determined extension, an assumed extension, or an absorption of high density elements, the method further comprising:
adapting the artifact correction method by modifying the at least one of the determined extension, the assumed extension, or the absorption of high density elements.

18. The method of claim 17, further comprising:
adapting the at least one of the determined extension, the assumed extension, or the absorption of high density elements by modifying a threshold used to segment the first data into metal parts and non-metal parts.

19. The method of claim 18, further comprising:
reconstructing a second image of the region of interest from the same first data used to reconstruct the image using the adapted artifact correction method.

20. The method of claim 19, further comprising:
reconstructing a third image of the region of interest from the same first data used to reconstruct the image and the second image using a second adapted artifact correction method, which is different from the adapted artifact correction method.

* * * * *